United States Patent
Xu et al.

(10) Patent No.: US 7,238,453 B2
(45) Date of Patent: Jul. 3, 2007

(54) NON-AQUEOUS ELECTROLYTIC SOLUTION WITH MIXED SALTS

(75) Inventors: Wu Xu, Broadview Heights, OH (US); Zhongyi Deng, Valley View, OH (US); Pascal Bolomey, Solon, OH (US); Martin W. Payne, Avon, OH (US)

(73) Assignee: Ferro Corporation, Cleveland, OH (US)

( * ) Notice: Subject to any disclaimer, the term of this patent is extended or adjusted under 35 U.S.C. 154(b) by 26 days.

(21) Appl. No.: 11/113,966

(22) Filed: Apr. 25, 2005

(65) Prior Publication Data

US 2006/0240322 A1  Oct. 26, 2006

(51) Int. Cl.
*H01M 6/16* (2006.01)
(52) U.S. Cl. .................. 429/332; 429/331; 429/231.1; 429/231.3; 429/217; 429/231.95; 429/231.8; 429/231.4
(58) Field of Classification Search ............... 429/337, 429/338, 341, 342, 343, 331, 231.1, 231.3, 429/217, 332, 231.95, 231.8, 231.4
See application file for complete search history.

(56) References Cited

U.S. PATENT DOCUMENTS

| 5,484,670 | A | 1/1996 | Angell |
|---|---|---|---|
| 5,521,027 | A | 5/1996 | Okuno |
| 5,525,443 | A | 6/1996 | Okuno |
| 5,554,462 | A | 9/1996 | Flandrois |
| 5,626,981 | A | 5/1997 | Simon |
| 5,707,759 | A | 1/1998 | Simon |
| 5,776,627 | A | 7/1998 | Mao |
| 5,786,110 | A | 7/1998 | Angell |
| 5,824,433 | A | 10/1998 | Angell |
| 5,849,432 | A | 12/1998 | Angell |
| 5,855,809 | A | 1/1999 | Agnell |
| 5,932,632 | A | 8/1999 | Biensan |
| 5,962,169 | A | 10/1999 | Angell |
| 6,001,325 | A | 12/1999 | Salmon |
| 6,033,797 | A | 3/2000 | Mao |
| 6,033,808 | A | 3/2000 | Salmon |
| 6,071,645 | A | 6/2000 | Biensan |
| 6,103,798 | A | 8/2000 | Prabhu |
| 6,245,465 | B1 | 6/2001 | Angell |
| 6,506,516 | B1 | 1/2003 | Wietelmann |
| 2004/0151951 | A1 | 8/2004 | Hyung |
| 2004/0253512 | A1 | 12/2004 | Watanabe |
| 2005/0202320 | A1* | 9/2005 | Totir et al. ............. 429/231.95 |

FOREIGN PATENT DOCUMENTS

| JP | 1998050344 A | 2/1998 |
|---|---|---|
| JP | 2000315504 A | 11/2000 |
| JP | 2002208432 A | 7/2002 |
| WO | WO 01/99209 A2 | 12/2001 |

OTHER PUBLICATIONS

Kang Xu, Shengshui Zhang, T. Richard Jow, Wu Xu, and C. Austen Angell; "LiBOB as Salt for Lithium-Ion Batteries A Possible Solution for High Temperature Operation"; Electrochemical and Solid-State Letters, 5 (1) A26-A29 (2002); The Electrochemical Society, Inc.
Wu Xu and C. Austen Angell; "LiBOB and Its Derivatives Weakly Coordinating Anions, and the Exceptional Conductivity of Their Nonaqueous Solutions"; Electrochemical and Solid-State Letters, 4 (1) E1-E4 (2001); The Electrochemical Society, Inc.
Kang Xu, Shengshui Zhang, Bruce A. Poese, and T. Richard Jow; "Lithium Bis(oxalato)borate Stablizes Graphite Anode in Propylene Carbonate"; Electrochemical and Solid-State Letters, 5 (11) A259-A262 (2002); The Electrochemical Society, Inc.
Commonly Owned U.S. Appl. No. 11/138,907, filed May 26, 2005.
Commonly Owned U.S. Appl. No. 11/138,769, filed May 26, 2005.
Commonly Owned U.S. Appl. No. 11/138,905, filed May 26, 2005.
Commonly Owned U.S. Appl. No. 11/113,823, filed Apr. 25, 2005.
Commonly Owned U.S. Appl. No. 11/196,782, filed Aug. 3, 2005.

* cited by examiner

*Primary Examiner*—Laura Weiner
(74) *Attorney, Agent, or Firm*—Rankin, Hill, Porter & Clark LLP

(57) ABSTRACT

The use of at least two electrolyte salts in a lithium secondary battery provides improved battery performance such as long cycle life of high discharge capacity and high capacity retention.

8 Claims, No Drawings

NON-AQUEOUS ELECTROLYTIC SOLUTION WITH MIXED SALTS

BACKGROUND OF THE INVENTION

1. Field of Invention

The present invention relates to a field of nonaqueous electrolytic solutions and a secondary battery using the same. More particularly, this invention pertains to nonaqueous electrolytic solutions that comprise (a) one or more solvents and (b) two or more ionic salts. The present invention pertains to secondary batteries comprising such nonaqueous electrolytic solutions, and particularly to methods of making nonaqueous electrolytic solutions with at least two salts for use in lithium and lithium ion rechargeable batteries.

2. Description of Related Art

Electrolytic solutions in state-of-the-art lithium ion rechargeable batteries contain ethylene carbonate (EC) as a co-solvent, and lithium hexafluorophosphate ($LiPF_6$) as an electrolytic salt. In the battery system, EC must be used in order to form stable solid electrolyte interface (SEI) that is critical to the cell performance.

$LiPF_6$ has been used as an electrolytic salt due to its good overall properties, although it does not have the best individual properties such as ion conductivity, ion mobility, thermal stability, and electrochemical stability, when compared with other lithium salts such as lithium perchlorate ($LiClO_4$), lithium tetrafluoroborate ($LiBF_4$), lithium hexafluoroarsenate ($LiAsF_6$), lithium bis(trifluoromethanesulfonyl)imide (LiTFSI), etc. However, due to its thermal instability at relatively high temperatures (see Reaction 1 below), $LiPF_6$-based electrolytic solutions cannot be used at temperatures above 50° C., which limits the cell performance of lithium ion rechargeable batteries containing $LiPF_6$-based electrolytes in higher temperature applications.

$$LiPF_6 \rightarrow LiF + PF_5 \quad (1)$$

On the other hand, $LiPF_6$ is not chemically stable and is easily to decompose by hydrolysis in the presence of residual moisture or acidic impurities in the lithium salt and solvents (see Reaction 2 below).

$$LiPF_6 + H_2O \rightarrow 2HF + LiF + POF_3 \quad (2)$$

The presence of the strong Lewis acid $PF_5$ and strong acid HF in the electrolytic solutions is very harmful to batteries because they react with solvent components and electrode active materials and corrodes the SEI, therefore, resulting in the poor long cycle life performance of the batteries. Hence, there is room for improvement in the selection of an electrolyte for use in secondary batteries.

SUMMARY OF THE INVENTION

In recent years, lithium bis(oxalato)borate (LiBOB), has been studied extensively. It has been found that LiBOB-PC based electrolytic solutions in graphite lithium ion battery systems showed very good cell performance because LiBOB generates a good SEI on graphite anodes, which improves battery performance.

At the same time, due to the very good thermal stability of LiBOB (up to 300° C.), batteries with LiBOB-based electrolytic solutions can be cycled at high temperatures such as 60° C. or even 70° C. and the battery performance keeps quite stable after long cycles.

However, the solubility of LiBOB is not high in conventional battery solvent systems incorporating ethylene carbonate (EC), ethyl methyl carbonate (EMC), dimethyl carbonate (DMC) or diethyl carbonate (DEC), or their combinations such as EC/EMC, EC/DMC/EMC, EC/EMC/DEC, etc. The maximum concentration of LiBOB in these solvent systems is about 0.8~0.9 M (i.e. mole/liter). Simultaneously the ionic conductivities of these LiBOB-based electrolytic solutions are several mS/cm lower than those of $LiPF_6$-based electrolytic solutions. Thus when electrolytic solutions containing LiBOB as the sole salt are used in high power lithium ion batteries, the capacity of the batteries is low and the battery performance at high rate charge/discharge is poor.

Therefore it is reasonable to assume that if $LiPF_6$ and LiBOB are mixed into conventional battery solvents, the lithium ion batteries using the resulting electrolytic solutions should perform well, especially in terms of long cycle life.

The present invention provides a stable nonaqueous electrolytic solution for use in lithium and lithium ion secondary batteries, and a rechargeable battery using the same. In particular, the present invention provides a secondary battery comprising an anode, a cathode, and an electrolytic solution, wherein the electrolytic solution comprises a non-aqueous solvent and a solute. The solute comprises a first lithium salt, and a second lithium salt, different from the first.

The invention further provides a secondary battery comprising an anode, a cathode, and, an electrolytic solution. The electrolytic solution comprises a non-aqueous solvent, a first salt comprising LiBOB in a concentration of over 0.15 M to about 2.0 M and a second salt in a concentration of about 0.01 M to about 2.5 M. The second salt may be selected from the group consisting of $LiPF_6$, $LiBF_4$, $LiClO_4$, $LiAsF_6$, $LiTaF_6$, $LiAlCl_4$, $Li_2B_{10}Cl_{10}$, $LiCF_3$, $SO3$, $LiE(C_nF_{2n+1}SO_2)_m$, wherein m=2 or 3, wherein E =N when m =2, and wherein E=C when m=3, and n=1–10; $LiPF_X(R_F)_{6-X}$, and $LiBF_y(R_F)_{4-y}$, wherein $R_F$ represents perfluorinated $C_1$–$C_{20}$ alkyl groups or perfluorinated aromatic groups, x=0–5, and y=0–3, and combinations thereof.

Further, the invention provides a non-aqueous electrolytic solution for use in a secondary battery comprising two salts, one of which is LiBOB in a concentration of at over 0.15 M.

DETAILED DESCRIPTION OF THE INVENTION

The following embodiments describe the preferred modes presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that described both the preferred and alternative embodiments of the present invention.

The invention provides a secondary battery comprising an anode, a cathode, an electrolytic solution, wherein the electrolytic solution comprises a non-aqueous solvent, and a solute comprising at least two salts. In a preferred embodiment, the first of the salts is a chelated orthoborate salt or chelated orthophosphate salt. The first salt is present in a concentration of over 0.15 M in the electrolytic solution. The invention further provides a non-aqueous electrolytic solution for use in a secondary battery, wherein the electrolytic solution comprises two salts, one of which is LiBOB. The major components, solute salts, solvent, anode and cathode are each described in turn hereinbelow.

Solute The solutes herein are ionic salts containing at least one metal ion. Typically this metal ion is lithium ($Li^+$). The salts herein function to transfer charge between the anode and the cathode of a battery. One class of salts includes salts of chelated orthoborates and chelated orthophosphates (collectively, hereinafter, "ortho-salts"). In a preferred embodiment, the first salt is LiBOB. Other ortho-salts salts may be used as well, either instead of or in addition to, LiBOB, for example, lithium bis(malonato) borate (LiBMB), lithium bis(difluoromalonato) borate (LiBDFMB), lithium (malonato oxalato) borate (LiMOB), lithium (difluoromalonato oxalato) borate (LiDFMOB), lithium tris(oxalato)phosphate (LiTOP), and lithium tris (difluoromalonato) phosphate (LiTDFMP). Another class of salts useful herein includes lithium salts that are perhalogenated, or peroxidated, for example, $LiPF_6$, $LiBF_4$, $LiClO_4$, $LiAsF_6$, $LiTaF_6$, $LiAlCl_4$, $Li_2B_{10}Cl_{10}$, $LiCF_3SO_3$, $LiE(C_nF_{2n+1}SO_2)_m$, wherein m=2 or 3, wherein E=N when m=2, and wherein E=C when m=3, and n=1–10; $LiPF_x(R_F)_{6-x}$, and $LiBF_y(R_F)_{4-y}$, wherein $R_F$ represents perfluorinated $C_1$–$C_{20}$ alkyl groups or perfluorinated aromatic groups, x=0–5. Any combination of two or more of the aforementioned salts may also be used.

Broadly, the concentration of salts (first or second salts) in the electrolytic solution is about 0.01–2.5 M (moles per liter). Preferably the concentration is 0.05–2.0 M, and more preferably 0.1–1.6M. In all embodiments herein, within the salt ranges given hereinabove, when one or more chelated orthoborate salts or chelated orthophosphate salts (e.g., LiBOB, LiBMB, etc,) are present the total concentration of such ortho-salts salts should be higher than 0.15 M (e.g, >0.15 M to 2.5 M, >0.15 M to 2.0M; >0.15M to 1.5M; >0.1 5M to 1.0M). When the ortho-salts are present, preferably, they are present in a concentration of at >0.15 to 2.0 M, more preferably about 0.3–1.6 M, and most preferably 0.4–1.2 M. In a most preferred embodiment, LiBOB is present in a concentration of 0.4–0.8M. Preferably, the first salt is a chelated orthoborate salt or a chelated orthophosphate salt, or combinations thereof. Most preferably the first salt is LiBOB.

Solvent. The solvent is a non-aqueous, aprotic, polar organic substance which dissolves the solute. Blends of more than one solvent may be used. Generally, solvents may be carbonates, carboxylates, lactones, phosphates, five or six member heterocyclic ring compounds, and organic compounds having at least one $C_1$–$C_4$ group connected through an oxygen atom to a carbon. Lactones may be methylated, ethylated and/or propylated. Generally, the electrolytic solution comprises at least one solute dissolved in at least one solvent. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the solute salts.

In a preferred embodiment, the solvent is selected from the group consisting of ethylene carbonate, propylene carbonate, ethyl methyl carbonate, diethyl carbonate and combinations thereof. In another embodiment, the solvent comprises about 1–50% by volume (vol %) ethylene carbonate, and about 1–99 vol % ethyl methyl carbonate. In another embodiment, the non-aqueous solvent comprises ethylene carbonate and ethyl methyl carbonate in a volume ratio of about 1:4 to about 1:1.

Anode. The anode may comprise carbon or compounds of lithium. The carbon may be in the form of graphite. Lithium metal anodes may be used. Lithium MMOs such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Cathode. The cathode comprises a lithium metal oxide compound. In particular, the cathode comprises at least one lithium mixed metal oxide (Li-MMO). Lithium mixed metal oxides contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiFePO_4$, $LiMn_{0.5}Ni_{0.5}O_2$, $LiMn_{1/3}Co_{1/3}Ni_{1/3}O_2$, wherein Me may be one or more of Al, Mg, Ti, B, Ga, or Si, and $LiMc_{0.5}Mn_{1.5}O_4$ wherein Mc is a divalent metal, and mixtures thereof.

Either the anode or the cathode, or both, may further comprise a polymeric binder. In a preferred embodiment, the binder may be polyvinylidene fluoride, styrene-butadiene rubber, polyamide or melamine resin, and combinations thereof.

The electrolytic solution in the present invention may further comprise one or more additives, such as a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g., biphenyl and cyclohexylbenzene) to prevent overcharge or overdischarge of the battery.

It is envisioned that the salt additives, electrolytic solutions and batteries discussed herein have a wide range of applications, including, at least, calculators, wrist watches, hearing aids, electronics such as computers, cell phones, games etc, and transportation applications such as battery powered and/or hybrid vehicles.

EXAMPLE

The following compositions represent exemplary embodiments of the invention. They are presented to explain the invention in more detail, and do not limit the invention.

(1) Preparation of Electrolytic Solutions.

Examples 1–4 and Comparative Examples 1–2.

Ethylene carbonate (EC) and ethyl methyl carbonate (EMC) were mixed in a volume ratio of 1:2 to prepare a nonaqueous organic solvent mixture. Lithium hexafluorophosphate (LiPF$_6$) and/or lithium bis(oxalato)borate were added into the solvent mixture, in amounts sufficient to give final concentrations shown in Table 1, to give the electrolytic solutions. All exemplary solutions were formulated at ambient temperature (ca.23° C.).

Table 1. Electrolytic Solutions: Inventive Examples 1–4 and Comparative Examples A–B.

|  | Salt | |
| --- | --- | --- |
| Example | LiPF$_6$ | LiBOB |
| Example 1 | 0.8 M | 0.2 M |
| Example 2 | 0.6 M | 0.4 M |
| Example 3 | 0.4 M | 0.6 M |
| Example 4 | 0.2 M | 0.7 M |
| Comparative Example A | 1.0 M | — |
| Comparative Example B | — | 0.8 M |

(2) Preparation of a Cathode. A positive electrode slurry was prepared by dispersing LiCoO$_2$ (positive electrode active material, 90 wt %), poly(vinylidenefluoride) (PVdF, binder, 5 wt %), and acetylene black (electro-conductive agent, 5 wt %) into 1-methyl-2-pyrrolidone (NMP). The slurry was coated on aluminum foil, dried, and compressed to give a cathode. The cathode was die-cut into discs by a punch with a diameter of 12.7 mm.

(3) Preparation of an Anode. Artificial graphite (negative electrode active material, 95 wt %) and PVdF (binder, 5 wt %) were mixed into NMP to form a negative active material slurry which was coated on copper foil, dried, and pressed to give an anode. The anode was die-cut into discs by a punch with a diameter of 14.3 mm.

(4) Assembly of a Lithium Ion Secondary Battery. A separate battery containing each of the above mentioned electrolytes (Examples 1–4 and Comparative Examples A–B) was made by the following procedure. In a dry box under an argon atmosphere, a lithium ion secondary battery was assembled using a 2032 type coin cell. A cathode was placed on a cathode can, and a microporous polypropylene film (25 μm thickness and 19.1 mm diameter) was placed as a separator. It was pressed with a polypropylene gasket, and an anode was placed. A stainless steel spacer and spring were included to adjust the thickness and make good contact. An electrolyic solution of each of Examples 1–4 and Comparative Examples A–B was added to each of six separate batteries and allowed to absorb. An anode cover was mounted to seal each battery with a crimper, to complete the assembly of the coin type lithium ion secondary battery.

(5) Testing of the Batteries. Evaluation of the aforementioned assembled batteries (e.g., Examples 1–4; Comparative Examples A–B) was carried out in the order (A) initial charging and discharging (confirmation of capacity) and (B) cycle life test.

A. Capacity Confirmation. Initial charging and discharging of the aforementioned assembled batteries were performed according to the constant current/voltage charging and constant current discharging method in a room temperature atmosphere. The battery was first charged up to 4.2 Volts (V) at a constant current rate of 0.5 mA/cm$^2$ (milliamps per square centimeter). After reaching 4.2 V, the battery was continually charged at a constant voltage of 4.2 V until the charging current reached or was less than 0.1 mA. Then the battery was discharged at a constant current rate of 0.3 mA/cm$^2$ until the cut-off voltage 3.0 V reached. Standard capacity (C) of a nonaqueous electrolyte secondary battery was 3.4 mAh (milliamp hours).

B. Cycle Life Test. Cycle life test was conducted over 100 cycles at room temperature by charging the aforementioned initially charged/discharged batteries at a constant current rate of C/2(1.7 mA) to 4.2 V and then charged at a constant voltage of 4.2 V till the current reached or was less than 0.1 mA. After that the battery was discharged at a constant current rate of C/2 (1.7 mA) until the cut-off voltage 3.0 V reached. Discharge capacity retention rate of cycle life (%)=(nth cycle discharge capacity/1$^{st}$ cycle discharge capacity)×100%. First cycle efficiency is cycle discharge capacity/1st cycle charge capacity×100%. Table 2 displays the results of the life cycle testing.

TABLE 2

Cycle life test results.

| Electrolyte | 1$^{st}$ cycle charge capacity (mAh) | 1$^{st}$ cycle efficiency | Discharge capacity retention | |
| --- | --- | --- | --- | --- |
|  |  |  | 50$^{th}$ cycle | 100$^{th}$ cycle |
| Example 1 | 3.54 | 95.5% | 92.0% | 92.9% |
| Example 2 | 3.58 | 95.8% | 92.4% | 93.6% |
| Example 3 | 3.52 | 93.8% | 94.8% | 94.5% |
| Example 4 | 3.50 | 94.6% | 94.0% | 94.3% |
| Comparative Example A | 3.43 | 93.9% | 87.3% | 85.7% |
| Comparative Example B | 3.42 | 92.4% | 91.8% | 93.0% |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A secondary battery comprising:
   a. an anode
   b. a cathode, and,
   c. an electrolytic solution, comprising
      i. a non-aqueous solvent, wherein the non-aqueous solvent comprises ethylene carbonate and ethylmethyl carbonate in a volume ratio of about 1:4 to about 1:1,
      ii. a first salt comprising lithium bis(oxalato)borate in a concentration of greater than 0.15 M to about 2.0 M and
      iii. a second salt in a concentration of about 0.1 M to about 1.6 M, wherein the second salt is selected from the group consisting of LiPF$_6$, LiBF$_4$, LiClO$_4$, LiAsF$_6$, LiTaF$_6$, LiAlCl$_4$, Li$_2$B$_{10}$Cl$_{10}$, LiCF$_3$SO$_3$, LiE(C$_n$F$_{2n+1}$ SO$_2$)$_m$, wherein m=2 or 3, wherein E=N when m=2, and wherein E=C when m=3, and n=1–10; LiPF$_x$(R$_F$)$_{6-x}$, and LiBF$_y$(R$_F$)$_{4-y}$, wherein R$_F$ represents perfluorinated C$_1$–C$_{20}$ alkyl groups or perfluorinated aromatic groups, x=0–5, and y=0–3, and combinations thereof.

2. The secondary battery of claim 1 wherein the cathode comprises a lithium mixed metal oxide selected from the group consisting of $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiFePO_4$, $LiMn_{0.5}Ni_{0.5}O_2$, $LiMn_{1/3}Co_{1/3}Ni_{1/3}O_2$, and $LiMc_{0.5}Mn_{1.5}O_4$ wherein Mc is a divalent metal, and mixtures thereof.

3. The secondary battery of claim 1 wherein the cathode further comprises a binder selected from the group consisting of polyvinylidene fluoride, styrene-butadiene rubber, polyamide, melamine, and combinations thereof.

4. The secondary battery of claim 1 wherein the anode comprises a material selected from the group consisting of crystalline carbon, lithium metal, $LiMnO_2$, LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof.

5. The secondary battery of claim 1 wherein the anode further comprises a binder selected from the group consisting of polyvinylidene fluoride, styrene-butadiene rubber, polyamide, melamine, and combinations thereof.

6. The secondary battery of claim 1 wherein the second salt is selected from the group consisting of $LiPF_6$, $LiBF_4$, and combinations thereof.

7. The secondary battery of claim 1 wherein lithium bis(oxalato)borate is present in a concentration of greater than 0.3 M to about 1.6 M.

8. The secondary battery of claim 1 wherein lithium bis(oxalato)borate is present in a concentration of about 0.4 M to about 1.2 M.

\* \* \* \* \*